(12) United States Patent
Gruber et al.

(10) Patent No.: US 8,334,052 B2
(45) Date of Patent: Dec. 18, 2012

(54) RADIATION HARDENED COMPOSITE LAYER PLATE OR FILM

(75) Inventors: Nick Gruber, Mannheim (DE); Reinhold Schwalm, Wachenheim (DE); Erich Beck, Ladenburg (DE); Klaus Menzel, Ludwigshafen (DE); Yvonne Heischkel, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 13/069,938

(22) Filed: Mar. 23, 2011

(65) Prior Publication Data

US 2011/0171476 A1 Jul. 14, 2011

Related U.S. Application Data

(62) Division of application No. 10/588,715, filed as application No. PCT/EP2005/001672 on Feb. 18, 2005, now Pat. No. 7,955,538.

(30) Foreign Application Priority Data

Feb. 24, 2004 (DE) .......................... 10 2004 009 437

(51) Int. Cl.
*B32B 27/32* (2006.01)
*B32B 9/04* (2006.01)
*B32B 27/00* (2006.01)
*B32B 27/36* (2006.01)
*B32B 27/06* (2006.01)
*B32B 27/08* (2006.01)

(52) U.S. Cl. ..................... 428/411.1; 428/220; 428/332; 428/421; 428/423.1; 428/473.5; 428/480; 428/500; 428/515

(58) Field of Classification Search ........................ None
See application file for complete search history.

(56) References Cited

U.S. PATENT DOCUMENTS

| | | | |
|---|---|---|---|
| 4,855,184 A | 8/1989 | Klun et al. | |
| 6,432,490 B1 * | 8/2002 | Rekowski et al. | ............ 427/508 |
| 6,777,089 B1 | 8/2004 | Koniger et al. | |
| 6,835,420 B1 | 12/2004 | Rockrath et al. | |
| 7,955,538 B2 * | 6/2011 | Gruber et al. | .................. 264/129 |

FOREIGN PATENT DOCUMENTS

| | | |
|---|---|---|
| EP | 0 361 351 | 4/1990 |
| EP | 0 819 516 | 1/1998 |
| EP | 0 819 520 | 1/1998 |
| EP | 0 819 546 | 1/1998 |
| EP | 0 874 027 | 10/1998 |
| WO | 00 39183 | 7/2000 |
| WO | 00 63015 | 10/2000 |
| WO | 01/12736 | 2/2001 |

\* cited by examiner

*Primary Examiner* — Sheeba Ahmed
(74) *Attorney, Agent, or Firm* — Oblon, Spivak, McClelland, Maier & Neustadt, L.L.P.

(57) ABSTRACT

The invention relates to a radiation-curable laminated sheet or film comprising at least one substrate layer and a top layer which comprises a radiation-curable material having a glass transition temperature below 50° C. and having a high double bond density, processes for the production thereof and the use thereof.

18 Claims, No Drawings

RADIATION HARDENED COMPOSITE LAYER PLATE OR FILM

The invention relates to a radiation-curable laminated sheet or film comprising at least one substrate layer and at least one top layer which comprises a radiation-curable material having a glass transition temperature below 50° C. and a high double bond density.

The application furthermore relates to a process for the production of radiation-curable laminated sheets or films and a process for the production of shaped articles which are laminated with this sheet or film and the use thereof.

EP-A2 819 516 and EP-A2 819 520 disclose coated films, the coating having a glass transition temperature below 40° C. and it being possible for the binder to be, for example, a phosphazene resin, urethanes or acrylates. The curing has to be carried out in two steps. Before adhesive bonding of the film to the substrates, partial curing is effected and the final curing is carried out only thereafter.

EP-A-361 351 likewise discloses a coated film. Here, the radiation curing of the film is effected before the application of the film to the shaped articles to be laminated.

EP-A2 874 027 discloses electron flash-curable compositions comprising two components, the first of which is a monofunctional radiation-curable compound whose homopolymer has a glass transition temperature of 20° C. or more and the second of which is a di(meth)acrylate, in the ratio 10:90-90:10. A higher-functional acrylate can optionally also be mixed with such compositions.

Disadvantageous thereby is the fact that the monofunctional (meth)acrylates often have high volatility owing to their low molecular weight which, owing to the general toxicity of (meth)acrylates, makes the uncured coating material unsafe with regard to health. Moreover, the use of monofunctional (meth)acrylates leads only to a low crosslinking density, which however is desired for positive coating properties.

The fact that the radiation curing often has to be carried out in a plurality of steps, as described in EP-A2 819 546, is disadvantageous in the case of the radiation-curable coated films known to date. In the case of complete radiation curing of the film before the coating process, the film often becomes brittle and difficult to shape, which is disadvantageous for the further processing of the film.

WO 00/63015 discloses laminated sheets or films which have a top layer having a glass transition temperature above 40° C. and a double bond density of up to 0.2 mol/100 g. The poor scratch resistance thereof and only a low gloss are disadvantages of such laminated sheets.

Radiation-curable laminated sheets or films which can be readily processed and can be used by as simple methods as possible for lamination with shaped articles were therefore an object of the invention. The laminated shaped articles should have good mechanical properties and good resistances to external influences and in particular should be stable to mechanical effects, for example should have improved scratch resistance, have high resilience and additionally have improved optical properties, such as, for example, increased gloss.

Accordingly, radiation-curable laminated sheets or films comprising at least one substrate layer and at least one top layer for lamination with shaped articles were found, the top layer consisting of a radiation-curable material which contains a binder having a glass transition temperature below 50° C. and a content of ethylenically unsaturated groups of more than 2 mol/kg of binder, referred to below as film for short.

Processes for the lamination of shaped articles with the film, and the laminated shaped articles, were also found.

The film has to consist of a substrate layer and a top layer which is applied directly or, if further intermediate layers are present, indirectly to the substrate layer.

Top Layer

The top layer is radiation-curable. The top layer used is therefore a radiation-curable material which comprises groups curable by a free radical or ionic method (curable groups for short). Groups curable by a free radical method are preferred.

The radiation-curable material is preferably transparent. Even after curing is complete, the top layer is preferably transparent, i.e. it is a clear coat.

A substantial component of the radiation-curable material is the binder, which forms the top layer by film formation.

The radiation-curable material preferably comprises at least one binder selected from the group consisting of i) polymers having ethylenically unsaturated groups and having an average molar mass $M_n$ of more than 2000 g/mol ii) mixtures of i) with ethylenically unsaturated, low molecular weight compounds differing from i) and having a molar mass of less than 2000 g/mol iii) mixtures of saturated thermoplastic polymers with ethylenically unsaturated compounds.

Re i)

Suitable polymers are, for example, polymers of ethylenically unsaturated compounds but also polyesters, polyethers, polycarbonates, polyepoxides or polyurethanes having a molar mass of more than 2000 g/mol.

For example, unsaturated polyester resins which substantially comprise polyols, in particular diols, and polycarboxylic acid, in particular dicarboxylic acid, are suitable, one of the esterification components comprising a copolymerizable, ethylenically unsaturated group. For example, this is maleic acid, fumaric acid or maleic anhydride.

Polymers of ethylenically unsaturated compounds as obtained in particular by free radical polymerization are preferred.

The polymers obtained by free radical polymerization are in particular polymers which are composed of more than 40% by weight, particularly preferably of more than 60% by weight, of acrylate monomers, in particular $C_1$-$C_8$-alkyl (meth)acrylates, preferably $C_1$-$C_4$-alkyl (meth)acrylates, particularly preferably methyl (meth)acrylate, ethyl (meth)acrylate or n-butyl (meth)acrylate.

As ethylenically unsaturated groups, the polymers comprise, for example, vinyl ether and/or in particular (meth) acrylate groups. These may be bonded to the polymer, for example, by reaction of (meth)acrylic acid with epoxide groups in the polymer (for example by the concomitant use of glycidyl (meth)acrylate as a comonomer).

Epoxide (meth)acrylates are obtainable by reacting epoxides with (meth)acrylic acid. Suitable epoxides are, for example, epoxidized olefins, aromatic glycidyl ethers or aliphatic glycidyl ethers, preferably those of aromatic or aliphatic glycidyl ethers.

Epoxidized olefins may be, for example, ethylene oxide, propylene oxide, isobutylene oxide, 1-butene oxide, 2-butene oxide, vinyloxirane, styrene oxide or epichlorohydrin, preferably ethylene oxide, propylene oxide, isobutylene oxide, vinyloxirane, styrene oxide or epichlorohydrin, particularly preferably ethylene oxide, propylene oxide or epichlorohydrin and very particularly preferably ethylene oxide and epichlorohydrin. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g. 2,5-bis[(2,3-epoxypropoxy)phenyl]

octahydro-4,7-methano-5H-indene) (CAS No. [13446-85-0]), tris[4-(2,3-epoxypropoxy)phenyl]methane isomers) (CAS No. [66072-39-7]), phenol-based epoxy novolaks (CAS No. [9003-35-4]) and cresol-based epoxy novolaks (CAS No. [37382-79-9]).

Aliphatic glycidyl ethers are, for example, 1,4-butanediol diglycidyl ether, 1,6-hexanediol diglycidyl ether, trimethylolpropane triglycidyl ether, pentaerythrityl tetraglycidyl ether, 1,1,2,2-tetrakis[4-(2,3-epoxypropoxy)phenyl]ethane (CAS No. [27043-37-4]), diglycidyl ethers of polypropylene glycol (α,ω-bis(2,3-epoxypropoxy)poly(oxypropylene) (CAS No. [16096-30-3]) and of hydrogenated bisphenol A (2,2-bis[4-(2,3-epoxypropoxy)cyclohexyl]propane (CAS No. [13410-58-7]).

The epoxide (meth)acrylates and epoxide vinyl ethers preferably have a number average molecular weight $M_n$ of from 2000 to 20 000, particularly preferably from 2000 to 10 000, g/mol and very particularly preferably from 2000 to 3000 g/mol; the content of (meth)acrylate and vinyl ether groups is preferably from 1 to 5, particularly preferably from 2 to 4, per 1000 g of epoxide (meth)acrylate or vinyl ether epoxide (determined by gel permeation chromatography using polystyrene as a standard and tetrahydrofuran as an eluent).

Polyurethanes are likewise preferred. These likewise preferably comprise, as unsaturated groups, (meth)acrylate groups which are bonded to the polyurethane, for example, by reaction of hydroxyalkyl (meth)acrylates with isocyanate groups.

Such urethane (meth)acrylates are obtainable, for example, by reacting polyisocyanates with hydroxyalkyl (meth)acrylates or hydroxyalkyl vinyl ethers and, if appropriate, chain extenders, such as diols, polyols, diamines, polyamines or dithiols or polythiols. Urethane (meth)acrylates dispersible in water without addition of emulsifiers additionally contain ionic and/or nonionic hydrophilic groups, which are introduced into the urethane, for example, by components such as hydroxcarboxylic acids.

The polyurethanes which can be used as binders substantially comprise as components:
(a) at least one organic aliphatic, aromatic or cycloaliphatic di- or polyisocyanate,
(b) at least one compound having at least one group reactive toward isocyanate and at least one unsaturated group capable of free radical polymerization and
(c) if appropriate, at least one compound having at least two groups reactive toward isocyanate.

For example, aliphatic, aromatic and cycloaliphatic di- and polyisocyanates having an NCO functionality of at least 1.8, preferably from 1.8 to 5 and particularly preferably from 2 to 4, and the isocyanurates, biurets, allophanates and uretdiones thereof, are suitable as component (a).

The diisocyanates are preferably isocyanates having 4 to 20 carbon atoms. Examples of conventional diisocyanates are aliphatic diisocyanates, such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, tetramethylxylylene diisocyanate, trimethylhexane diisocyanate or tetramethylhexane diisocyanate, cycloaliphatic diisocyanates, such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and aromatic diisocyanates, such as toluene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, biphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or 4,4'-diisocyanatodiphenyl ether. Mixtures of said diisocyanates may also be present.

Hexamethylene diisocyanate, 1,3-bis(isocyanatomethyl) cyclohexane, isophorone diisocyanate and di(isocyanatocyclohexyl)methane are preferred.

Suitable polyisocyanates are polyisocyanates having isocyanurate groups, uretdione diisocyanates and polyisocyanates having biuret groups, polyisocyanates having urethane or allophanate groups, polyisocyanates comprising oxadiazinetrione groups, uretonimine-modified polyisocyanates of linear or branched $C_4$-$C_{20}$-alkylene diisocyanates, cycloaliphatic diisocyanates having in total 6 to 20 carbon atoms or aromatic diisocyanates having in total 8 to 20 carbon atoms or mixtures thereof.

The di- and polyisocyanates which can be used preferably contain from 10 to 60% by weight, based on the di- and polyisocyanate (mixture), preferably from 15 to 60% by weight and particularly preferably from 20 to 55% by weight, of isocyanate groups (calculated as NCO, molecular weight=42).

Aliphatic or cycloaliphatic di- and polyisocyanates, for example the above-mentioned aliphatic or cycloaliphatic diisocyanates, or mixtures thereof, are preferred.

The following are furthermore preferred:
1) Polyisocyanates having isocyanurate groups and obtained from aromatic, aliphatic and/or cycloaliphatic diisocyanates. Particularly preferred here are the corresponding aliphatic and/or cycloaliphatic isocyanatoisocyanurates and in particular those based on hexamethylene diisocyanate and isophorone diisocyanate. The isocyanurates present are in particular trisisocyanatoalkyl or trisisocyanatocycloalkyl isocyanurates, which are cyclic trimers of the diisocyanates, or are mixtures with their higher homologs having more than one isocyanurate ring. The isocyanatoisocyanurates generally have an NCO content of from 10 to 30% by weight, in particular from 15 to 25% by weight, and an average NCO functionality of from 3 to 4.5.
2) Uretdione diisocyanates having aromatically, aliphatically and/or cycloaliphatically bonded isocyanate groups, preferably having aliphatically and/or cycloaliphatically bonded groups and in particular those derived from hexamethylene diisocyanate or isophorone diisocyanate. Uretdione diisocyanates are cyclic dimerization products of diisocyanates.

The uretdione diisocyanates can be used in the formulations as a sole component or as a mixture with other polyisocyanates, in particular those mentioned under 1).
3) Polyisocyanates having biuret groups and having aromatically, cycloaliphatically or aliphatically bonded, preferably cycloaliphatically or aliphatically bonded, isocyanate groups, in particular tris(6-isocyanatohexyl)biuret or mixtures thereof with its higher homologs. These polyisocyanates having biuret groups generally have an NCO content of from 18 to 22% by weight and an average NCO functionality of from 3 to 4.5.
4) Polyisocyanates having urethane and/or allophanate groups and having aromatically, aliphatically or cycloaliphatically bonded, preferably aliphatically or cycloaliphatically bonded, isocyanate groups, as can be obtained, for example, by reaction of excess amounts of hexamethylene diisocyanate or of isophorone diisocyanate with polyhydric alcohols, such as, for example, trimethylolpropane, neopentylglycol, pentaerythritol, 1,4-butanediol, 1,6-hexanediol, 1,3-propanediol, ethylene glycol, diethylene glycol, glycerol, 1,2-dihydroxypropane or mixtures thereof. These polyisocyanates having urethane and/or allophanate groups generally have an NCO content of from 12 to 20% by weight and an average NCO functionality of from 2.5 to 3.

5) Polyisocyanates comprising oxadiazinetrione groups, preferably derived from hexamethylene diisocyanate or isophorone diisocyanate. Such polyisocyanates comprising oxadiazinetrione groups can be prepared from diisocyanate and carbon dioxide.

6) Uretonimine-modified polyisocyanates.

The polyisocyanates 1) to 6) can be used as a mixture, if appropriate also as a mixture with diisocyanates.

Compounds suitable as component (b) are those which carry at least one group reactive toward isocyanate and at least one group capable of free radical polymerization.

Groups reactive toward isocyanates may be, for example, —OH, —SH, —NH$_2$ and —NHR$^1$, where R$^1$ is hydrogen or an alkyl group comprising 1 to 4 carbon atoms, such as, for example, methyl, ethyl, n-propyl, isopropyl, n-butyl, isobutyl, sec-butyl or tert-butyl.

Components (b) may be, for example, monoesters of α,β-unsaturated carboxylic acids, such as acrylic acid, methacrylic acid, crotonic acid, itaconic acid, fumaric acid, maleic acid, acrylamidoglycolic acid or methacrylamidoglycolic acid, or vinyl ethers with di- or polyols, which preferably have 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentylglycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, poly-THF having a molecular weight of from 162 to 2000, poly-1,3-propanediol having a molecular weight of from 134 to 400 or polyethylene glycol having a molecular weight of from 238 to 458. It is furthermore possible to use esters or amides of (meth)acrylic acid with amino alcohols, e.g. 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine, or vinylacetic acid.

Unsaturated polyetherols or polyesterols or polyacrylate-polyols having an average OH functionality of from 2 to 10 are furthermore suitable.

Examples of amides of ethylenically unsaturated carboxylic acids with amino alcohols are hydroxyalkyl(meth)acrylamides, such as N-hydroxymethylacrylamide, N-hydroxymethylmethacrylamide, N-hydroxyethylacrylamide, N-hydroxyethyl-methacrylamide, 5-hydroxy-3-oxapentyl (meth)acrylamide, N-hydroxyalkylcrotonamides, such as N-hydroxymethylcrotonamide or N-hydroxyalkylmaleimides, such as N-hydroxyethylmaleimide.

2-Hydroxyethyl (meth)acrylate, 2- or 3-hydroxypropyl (meth)acrylate, 1,4-butanediol mono(meth)acrylate, neopentylglycol mono(meth)acrylate, 1,5-pentanediol mono(meth)acrylate, 1,6-hexanediol mono(meth)acrylate, glyceryl mono- and di(meth)acrylate, trimethylolpropane mono- and di(meth)acrylate, pentaerythrityl mono-, di- and tri(meth)acrylate, and 4-hydroxybutyl vinyl ether, 2-aminoethyl (meth)acrylate, 2-aminopropyl (meth)acrylate, 3-aminopropyl (meth)acrylate, 4-aminobutyl (meth)acrylate, 6-aminohexyl (meth)acrylate, 2-thioethyl (meth)acrylate, 2-aminoethyl(meth)acrylamide, 2-aminopropyl(meth)acrylamide, 3-aminopropyl-(meth)acrylamide, 2-hydroxyethyl(meth)acrylamide, 2-hydroxypropyl(meth)acrylamide or 3-hydroxypropyl(meth)acrylamide are preferably used. 2-Hydroxyethyl acrylate, 2-hydroxyethyl methacrylate, 2- or 3-hydroxypropyl acrylate, 1,4-butanediol monoacrylate and 3-(acryloyloxy)-2-hydroxypropyl methacrylate are particularly preferred.

Compounds which are suitable as component (c) are those which have at least two groups reactive toward isocyanate, for example —OH, —SH, —NH$_2$ or —NHR$^2$, where R$^2$ therein, independently of one another, may be hydrogen, methyl, ethyl, isopropyl, n-propyl, n-butyl, isobutyl, sec-butyl or tert-butyl.

These are preferably diols or polyols, such as hydrocarbondiols having 2 to 20 carbon atoms, e.g. ethylene glycol, 1,2-propanediol, 1,3-propanediol, 1,1-dimethylethane-1,2-diol, 1,6-hexanediol, 1,10-decanediol, bis-(4-hydroxycyclohexane)isopropylidene, tetramethylcyclobutanediol, 1,2-, 1,3- or 1,4-cyclohexanediol, cyclooctanediol, norbornanediol, pinanediol, decalindiol, etc., esters thereof with short-chain dicarboxylic acids, such as adipic acid or cyclohexanedicarboxylic acid, carbonates thereof, prepared by reaction of the diols with phosgene or by transesterification with dialkyl or diaryl carbonates, or aliphatic diamines, such as methylene- and isopropylidenebis(cyclohexylamine), piperazine, 1,2-, 1,3- or 1,4-diaminocyclohexane, 1,2-, 1,3- or 1,4-cyclohexanebis(methylamine), etc., dithiols or polyfunctional alcohols, secondary or primary amino alcohols, such as ethanolamine, diethanolamine, monopropanolamine, dipropanolamine, etc., or thioalcohols, such as thioethylene glycol.

Diethylene glycol, triethylene glycol, dipropylene glycol, tripropylene glycol, neopentylglycol, pentaerythritol, 1,2- and 1,4-butanediol, 1,5-pentanediol, 2-methyl-1,5-pentanediol, 2-ethyl-1,4-butanediol, 1,2-, 1,3- and 1,4-dimethylolcyclohexane, 2,2-bis(4-hydroxycyclohexyl)propane, glycerol, trimethylolethane, trimethylolpropane, trimethylolbutane, dipentaerythritol, ditrimethylolpropane, erythritol and sorbitol, 2-aminoethanol, 3-amino-1-propanol, 1-amino-2-propanol or 2-(2-aminoethoxy)ethanol, bisphenol A or butanetriol are furthermore conceivable.

Unsaturated polyetherols or polyesterols or polyacrylate-polyols having an average OH functionality of 2 to 10, and polyamines, such as, for example, polyethylenimine, or polymers of, for example, poly-N-vinylformamide which comprise free amino groups, are furthermore suitable.

The cycloaliphatic diols, such as, for example, bis-(4-hydroxycyclohexane)-isopropylidene, tetramethylcyclobutanediol, 1,2-, 1,3- or 1,4-cyclohexanediol, cyclooctanediol or norbornanediol, are particularly suitable here.

The polyurethanes which can be used according to the invention are obtained by reacting the components (a), (b) and (c) with one another.

The molar composition (a):(b):(c) per 3 mol of reactive isocyanate groups in (a) is as a rule as follows:

(b) 1.5-3.0, preferably 1.5-2.5, particularly preferably 1.5-2.0 and in particular 1.6-1.8 mol of groups reactive toward isocyanate and (c) 0-1.5, preferably 0.5-1.5, particularly preferably 0.7-1.5 and in particular 0.8-1.5 mol of groups reactive toward isocyanate.

With the use of the polyurethanes in aqueous systems, preferably substantially all isocyanate groups present have reacted.

The formation of the adduct from the compound containing isocyanate groups and the compound which comprises groups reactive toward isocyanate groups is effected, as a rule, by mixing the components in any desired sequence, if appropriate at elevated temperature.

Preferably, the compound which comprises groups reactive toward isocyanate groups is added to the compound containing isocyanate groups, preferably in a plurality of steps.

Particularly preferably, the compound containing isocyanate groups is initially taken and the compounds which comprise groups reactive toward isocyanate are added. In particular, the compound (a) containing isocyanate groups is initially taken and then (b) is added. If appropriate, desired further components can subsequently be added.

As a rule, the reaction is carried out at temperatures between 5 and 100° C., preferably between 20 and 90° C. and particularly preferably between 40 and 80° C. and in particular between 60 and 80° C.

The procedure is preferably carried out under anhydrous conditions.

Here, anhydrous means that the water content in the reaction system is not more than 5% by weight, preferably not more than 3% by weight and particularly preferably not more than 1% by weight.

In order to suppress polymerization of the polymerizable double bonds, the procedure is preferably carried out under an oxygen-containing gas, particularly preferably air or air-nitrogen mixtures.

Air or a mixture of oxygen or air and a gas which is inert under the conditions of use can preferably be used as the oxygen-containing gas. Nitrogen, helium, argon, carbon monoxide, carbon dioxide, steam, lower hydrocarbons or mixtures thereof can be used as the inert gas.

The oxygen content of the oxygen-containing gas may be, for example, from 0.1 to 22% by volume, preferably from 0.5 to 20, particularly preferably from 1 to 15, very particularly preferably from 2 to 10 and in particular from 4 to 10% by volume. If desired, higher oxygen contents can of course also be used.

The reaction can also be carried out in the presence of an inert solvent, e.g. acetone, isobutyl methyl ketone, toluene, xylene, butyl acetate or ethoxyethyl acetate. However, the reaction is preferably carried out in the absence of a solvent.

The urethane (meth)acrylates preferably have a number average molecular weight $M_n$ from 1000 to 20 000, in particular from 1000 to 10 000, particularly preferably from 1000 to 4000, g/mol (determined by gel permeation chromatography using tetrahydrofuran and polystyrene as standard).

The urethane (meth)acrylates preferably contain from 1 to 5, particularly preferably from 2 to 4, mol of (meth)acrylate groups per 1000 g of urethane (meth)acrylate. The urethane vinyl ethers preferably contain from 1 to 5, particularly preferably from 2 to 4, mol of vinyl ether groups per 1000 g of urethane vinyl ether.

In a preferred embodiment of this invention, the urethane (meth)acrylates or urethane vinyl ethers, preferably urethane acrylates, comprise at least one cycloaliphatic isocyanate, i.e. a compound in which at least one isocyanate group is bonded to a cycloaliphatic, as a component, particularly preferably IPDI.

In a further preferred embodiment, compounds used are those as described in WO 00/39183, page 4, line 3 to page 10, line 19, the disclosure of which is hereby incorporated by reference. Particularly preferred among these are those compounds which have, as components, at least one (cyclo)aliphatic isocyanate having allophanate groups and at least one hydroxyalkyl (meth)acrylate, very particularly preferably product No. 1 to 9 in table 1 on page 24 of WO 00/39183.

Other suitable radiation-curable compounds are carbonate (meth)acrylates which comprise on average preferably from 1 to 5, in particular from 2 to 4, particularly preferably 2 or 3, (meth)acrylate groups and very particularly preferably 2 (meth)acrylate groups.

The number average molecular weight $M_n$ of the carbonate (meth)acrylates is preferably from 2000 to 3000 g/mol (determined by gel permeation chromatography using polystyrene as a standard and tetrahydrofuran as a solvent).

The carbonate (meth)acrylates are obtainable in a simple manner by transesterification of carbonic esters with polyhydric, preferably dihydric, alcohols (diols, e.g. hexanediol) and subsequent esterification of the free OH groups with (meth)acrylic acid, or transesterification with (meth)acrylic esters, as described, for example, in EP-A 92 269. They are also obtainable by reacting phosgene, urea derivatives with polyhydric, e.g. dihydric, alcohols.

In an analogous manner, vinyl ether carbonates are also obtainable by reacting a hydroxyalkyl vinyl ether with carbonic esters and, if appropriate, dihydric alcohols.

(Meth)acrylates or vinyl ethers of polycarbonatepolyols, such as reaction product of one of said di- or polyols and a carbonic ester or else a hydroxyl-containing (meth)acrylate or vinyl ether, are also conceivable.

Suitable carbonic esters are, for example, ethylene or 1,2- or 1,3-propylene carbonate or dimethyl, diethyl or dibutyl carbonate.

Suitable hydroxyl-containing (meth)acrylates are, for example, 2-hydroxyethyl (meth)acrylate, 2- or 3-hydroxypropyl (meth)acrylate, 1,4-butanediol mono(meth)acrylate, neopentylglycol mono(meth)acrylate, glyceryl mono- and di(meth)acrylate, trimethylolpropane mono- and di(meth)acrylate and pentaerythrityl mono-, di- and tri(meth)acrylate.

Suitable hydroxyl-containing vinyl ethers are, for example, 2-hydroxyethyl vinyl ether and 4-hydroxybutyl vinyl ether.

Particularly preferred carbonate (meth)acrylates are those of the formula:

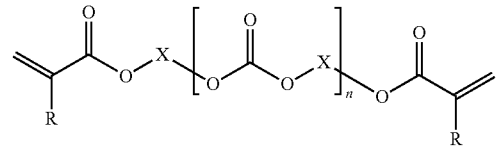

where R is H or $CH_3$, X is a $C_2$-$C_{18}$-alkylene group and n is an integer from 1 to 5, preferably from 1 to 3.

R is preferably H and X is preferably $C_2$- to $C_{10}$-alkylene, for example 1,2-ethylene, 1,2-propylene, 1,3-propylene, 1,4-butylene or 1,6-hexylene, particularly preferably $C_4$- to $C_8$-alkylene. Very particularly preferably, X is $C_6$-alkylene.

They are preferably aliphatic carbonate (meth)acrylates.

The polymers i) as such are thermoplastically processible before the UV curing.

Re ii)

The unsaturated polymers i) can be used as mixtures with ethylenically unsaturated, low molecular weight compounds.

In this context, low molecular weight compounds are understood as meaning compounds having a number average molecular weight of less than 2000 g/mol (determined by gel permeation chromatography using polystyrene as a standard).

These may be, for example, those compounds mentioned under i) which have a molar mass of less than 2000 g/mol, for example epoxide (meth)acrylates having a molar mass of 340, preferably 500 and particularly preferably 750 to less than 2000 g/mol, urethane (meth)acrylates having a molar mass of 300, preferably 500 and particularly preferably 750 to less than 2000 g/mol or carbonate (meth)acrylates having a molar mass of 170, preferably 250 and particularly preferably 500 to less than 2000 g/mol.

Furthermore suitable are, for example, compounds capable of free radical polymerization and having only one ethylenically unsaturated, copolymerizable group.

Examples are $C_1$-$C_{20}$-alkyl (meth)acrylates, vinylaromatics having up to 20 carbon atoms, vinyl esters of carboxylic acids comprising up to 20 carbon atoms, ethylenically unsaturated nitriles, vinyl ethers of alcohols comprising 1 to 10 carbon atoms and aliphatic hydrocarbons having 2 to 20, preferably 2 to 8, carbon atoms and 1 or 2 double bonds.

Preferred alkyl (meth)acrylates are those having a $C_1$-$C_{10}$-alkyl radical, such as methyl methacrylate, methyl acrylate, n-butyl acrylate, ethyl acrylate and 2-ethylhexyl acrylate.

Mixtures of the alkyl (meth)acrylates are also particularly suitable.

Vinyl esters of carboxylic acids having 1 to 20 carbon atoms are, for example, vinyl laurate, vinyl stearate, vinyl propionate and vinyl acetate.

Suitable vinylaromatic compounds are, for example, vinyltoluene, α-butylstyrene, 4-n-butylstyrene, 4-n-decylstyrene and preferably styrene.

Examples of nitriles are acrylonitrile and methacrylonitrile.

Suitable vinyl ethers are, for example, vinyl methyl ether, vinyl isobutyl ether, vinyl hexyl ether and vinyl octyl ether.

Butadiene, isoprene and ethylene, propylene and isobutylene may be mentioned as nonaromatic hydrocarbons having 2 to 20, preferably 2 to 8, carbon atoms and one or two olefinic double bonds.

Compounds capable of free radical polymerization and having a plurality of ethylenically unsaturated groups are preferred.

These are in particular (meth)acrylate compounds, the acrylate compounds, i.e. the derivatives of acrylic acid, being preferred in each case.

Preferred (meth)acrylate compounds contain 2 to 20, preferably 2 to 10 and very particularly preferably 2 to 6 copolymerizable, ethylenically unsaturated double bonds.

(Meth)acrylic esters and in particular acrylic esters of polyfunctional alcohols, in particular those which comprise no further functional groups or at least ether groups apart from the hydroxyl groups may be mentioned as (meth)acrylate compounds. Examples of such alcohols are, for example, bifunctional alcohols, such as ethylene glycol, propylene glycol and the members thereof having a higher degree of condensation, for example such as diethylene glycol, triethylene glycol, dipropylene glycol, tripropylene glycol, etc., butanediol, pentanediol, hexanediol, neopentylglycol, alkoxylated phenolic compounds, such as ethoxylated or propoxylated bisphenols, cyclohexanedimethanol, trifunctional and higher-functional alcohols, such as glycerol, trimethylolpropane, trimethylolethane, neopentylglycol, pentaerythritol, glycerol, ditrimethylolpropane, dipentaerythritol, sorbitol, mannitol, diglycerol, 1,2-propanediol, ethylene glycol, 2,2-dimethyl-1,2-ethanediol, neopentylglycol, 1,3-propanediol, 1,2-butanediol, 1,4-butanediol, butanetriol, sorbitol, mannitol and the corresponding alkoxylated, in particular ethoxylated and propoxylated, alcohols.

The alkoxylation products are obtainable in a known manner by reaction of the above alcohols with alkylene oxides, for example ethylene oxide, propylene oxide, butylene oxide, isobutylene oxide and vinyloxirane, in any desired sequence or as a mixture, preferably ethylene oxide and/or propylene oxide and particularly preferably ethylene oxide. The degree of alkoxylation per hydroxyl group is preferably from 0 to 10, i.e. 1 mol of hydroxyl can preferably be alkoxylated with up to 10 mol of alkylene oxides.

Polyetheralcohols containing vinyl ether groups are obtained, for example, in a corresponding manner by reaction of hydroxyalkyl vinyl ethers with alkylene oxides.

Polyetheralcohols containing (meth)acrylic acid groups can be obtained, for example, by transesterification of (meth)acrylic esters with the polyetheralcohols, by esterification of the polyetheralcohols with (meth)acrylic acid or by use of hydroxyl-containing (meth)acrylates as described above under (b).

Preferred polyetheralcohols are polyethylene glycols having a molar mass between 106 and 2000, preferably between 106 and 898, particularly preferably between 238 and 678.

Poly-THF having a molar mass between 162 and 2000 and poly-1,3-propanediol having a molar mass between 134 and 1178 can furthermore be used as polyetheralcohols.

Polyester (meth)acrylates may furthermore be mentioned as (meth)acrylate compounds, these being the (meth)acrylic esters of polyesterols.

Polyesterpolyols are known, for example, from Ullmanns Enzyklopädie der technischen Chemie, 4th Edition, Volume 19, pages 62 to 65. Polyesterpolyols which are obtained by reacting dihydric alcohols with dibasic carboxylic acids are preferably used. Instead of the free polycarboxylic acids, it is also possible to use the corresponding polycarboxylic anhydrides or corresponding polycarboxylic esters of lower alcohols or mixtures thereof for the preparation of the polyesterpolyols. The polycarboxylic acids may be aliphatic, cycloaliphatic, araliphatic, aromatic, heterocyclic and, if appropriate, may be, for example, substituted by halogen atoms and/or unsaturated. The following may be mentioned as examples of these:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, the isomers and hydrogenation products thereof and esterifiable derivatives, such as anhydrides or dialkyl esters, for example $C_1$-$C_4$-alkyl esters, preferably methyl, ethyl or n-butyl esters, of said acids. Dicarboxylic acids of the general formula HOOC—$(CH_2)_y$—COOH, where y is a number from 1 to 20, preferably an even number from 2 to 20, are preferred, succinic acid, adipic acid, sebacic acid and dodecanedicarboxylic acid being particularly preferred.

Suitable polyhydric alcohols for the preparation of the polyesterols are 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, poly-THF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentylglycol, neopentylglycol hydroxypivalate, 2-ethyl-1,3-propanediol, 2-methyl-1,3-propanediol, 2,2-bis(4-hydroxycyclohexyl)propane, 1,1-, 1,2-, 1,3- and 1,4-cyclohexanedimethanol, 1,2-, 1,3- or 1,4-cyclohexanediol, trimethlyolbutane, trimethylolpropane, trimethylolethane, neopentylglycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomaltitol.

Alcohols of the general formula HO—$(CH_2)_x$—OH, where x is a number from 1 to 20, preferably an even number from 2 to 20, are preferred. Ethylene glycol, butane-1,4-diol, hexane-1,6-diol, octane-1,8-diol and dodecane-1,12-diol are preferred. Neopentylglycol is furthermore preferred.

Polycarbonatediols, as can be obtained, for example, by reacting phosgene with an excess of the low molecular weight alcohols mentioned as components for the polyesterpolyols are furthermore suitable.

Lactone-based polyesterdiols are also suitable, these being homo- or copolymers of lactones, preferably adducts of lactones with suitable difunctional initiator molecules, which adducts have terminal hydroxyl groups. Preferred lactones are those which are derived from compounds of the general formula HO—$(CH_2)_z$—COOH, where z is a number from 1 to 20 and an H atom of a methylene unit may also be substituted by a $C_1$- to $C_4$-alkyl radical. Examples are ε-caprolactone, β-propiolactone, gamma-butyrolactone and/or methyl-ε-caprolactone, 4-hydroxybenzoic acid, 6-hydroxy-2-naphthalenecarboxylic acid or pivalolactone and mixtures thereof. Suitable initiator components are, for example, the low molecular weight dihydric alcohols mentioned above as a component for the polyesterpolyols. The corresponding polymers of ε-caprolactone are particularly preferred. Lower polyesterdiols or polyetherdiols can also be used as initiators for the preparation of the lactone polymers. Instead of the polymers of lactones, it is also possible to use the corresponding, chemically equivalent polycondensates of the hydroxycarboxylic acids corresponding to the lactones.

Polyester (meth)acrylates can be prepared in a plurality of stages or in one stage, as described, for example, in EP 279 303, from acrylic acid, polycarboxylic acid and polyol.

Re iii)

Suitable saturated thermoplastic polymers are, for example, polymethyl methacrylate, polystyrene, impact-resistant polymethyl methacrylate, high-impact polystyrene, polycarbonate and polyurethanes.

The radiation curability is ensured by the addition of an ethylenically unsaturated, radiation-curable compound. This may be one of the compounds mentioned under i) and/or ii).

The binders (based on the solids content, i.e. without the presence of solvents) have, as a rule, the following composition:

i) at least 20% by weight, preferably at least 30% by weight, particularly preferably at least 50, very particularly preferably at least 60, in particular at least 75 and especially at least 80% by weight and up to 100% by weight, preferably up to 98% by weight, particularly preferably up to 95, very particularly preferably up to 90 and in particular up to 85% by weight, ii) for example, up to 70% by weight, preferably up to 50% by weight, particularly preferably up to 25% by weight, very particularly preferably up to 10, in particular up to 5% by weight and especially 0% by weight, iii) for example, up to 50% by weight, preferably up to 25% by weight, particularly preferably up to 10% by weight, very particularly preferably up to 5% by weight and in particular 0% by weight, with the proviso that the sum is always 100% by weight.

A substantial feature of the binder i) to iii) is that the glass transition temperature ($T_g$) of the binder is below 50° C., preferably below 20° C., particularly preferably below 10° C. In general, the $T_g$ does not fall below a value of −60° C. (The data relate to the binder before the radiation curing.)

The glass transition temperature $T_g$ of the binder is determined by the DSC method (differential scanning calorimetry) according to ASTM 3418/82.

According to the invention, the amount of the curable, i.e. ethylenically unsaturated, groups is more than 2 mol/kg, preferably more than 2 mol/kg to 8 mol/kg, particularly preferably at least 2.1 mol/kg to 6 mol/kg, very particularly preferably 2.2 to 6, in particular 2.3 to 5 and especially 2.5 to 5 mol/kg of the binder (solid), i.e. without water or other solvents.

The binder (with solvent present if appropriate) preferably has a viscosity of from 0.02 to 100 Pa·s at 25° C. (determined in a rotational viscometer).

In a preferred embodiment of the present invention, the radiation-curable material according to the invention comprises not more than 10% by weight of compounds which have only one curable group, preferably not more than 7.5% by weight, particularly preferably not more than 5% by weight, very particularly preferably not more than 2.5% by weight, in particular not more than 1% by weight and especially 0% by weight. In the radiation-curable materials according to the invention, the use of compounds having two or more curable groups leads to an increased crosslinking density, which leads to positive coating properties, such as scratch resistance, hardness and/or resistance to chemicals.

The radiation-curable materials may comprise further components. In particular, photoinitiators, leveling agents and stabilizers may be mentioned. In exterior applications, i.e. for coatings which are exposed directly to daylight, the materials contain in particular UV absorbers and free radical scavengers.

For example, tin octanoate, zinc octanoate, dibutyltin laurate or diaza [2.2.2]-bicyclooctane, can be used as accelerators for the thermal postcuring.

Photoinitiators may be, for example, photoinitiators known to the person skilled in the art, for example those mentioned in "Advances in Polymer Science", Volume 14, Springer Berlin 1974 or in K. K. Dietliker, Chemistry and Technology of UV- and EB-Formulation for Coatings, Inks and Paints, Volume 3; Photoinitiators for Free Radical and Cationic Polymerization, P. K. T. Oldring (Eds), SITA Technology Ltd, London.

For example, mono- or bisacylphosphine oxides, as described, for example, in EP-A 7 508, EP-A 57 474, DE-A 196 18 720, EP-A 495 751 or EP-A 615 980 are suitable, for example 2,4,6-trimethylbenzoyldiphenylphosphine oxide (Lucirin® TPO from BASF AG), ethyl-2,4,6-trimethylbenzoylphenylphosphinate (Lucirin® TPO L from BASF AG), bis-(2,4,6-trimethylbenzoyl)phenylphosphine oxide (Irgacure® 819 from Ciba Spezialitätenchemie), benzophenones, hydroxyacetophenones, phenylglyoxylic acid and its derivatives or mixtures of these photoinitiators. Benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7-H-benzoin methyl ether, benz[de]anthracen-7-one, 1-naphthaldehyde, 4,4'-bis(dimethylamino) benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones, such as 2-methylanthraquinone, 2-ethylanthraquinone, 2-tert-butylanthraquinone, 1-chloroanthraquinone, 2-amylanthraquinone and 2,3-butanedione may be mentioned by way of example.

Non-yellowing or slightly yellowing photoinitiators of the phenylglyoxalic ester type, as described in DE-A 198 26 712, DE-A 199 13 353 or WO 98/33761 are also suitable.

UV absorbers convert UV radiation into heat energy. Known UV absorbers are hydroxybenzophenones, benzotriazoles, cinnamic esters and oxalanilides.

Free radical scavengers bind free radicals formed as intermediates. Important free radical scavengers are sterically hindered amines, which are known as HALS (hindered amine light stabilizers).

For exterior applications, the total content of UV absorbers and free radical scavengers is preferably from 0.1 to 5 parts by weight, particularly preferably from 0.5 to 4 parts by weight, based on 100 parts by weight of the radiation-curable compounds.

Otherwise, in addition to radiation-curable compounds, the radiation-curable materials may also comprise compounds which contribute to the curing through other chemical reactions. For example, polyisocyanates which crosslink with hydroxyl or amino groups are suitable.

The radiation-curable materials may be present in anhydrous and solvent-free form, as a solution or as a dispersion.

Anhydrous and solvent-free radiation-curable materials or aqueous solutions or aqueous dispersions are preferred.

Anhydrous and solvent-free, radiation-curable materials are particularly preferred.

The radiation-curable material can be molded by a thermoplastic method and can be extruded.

The above radiation-curable materials form the top layer. The layer thickness (after drying and curing) is preferably from 10 to 100 μm.

Substrate Layer

The substrate layer serves as a base and is intended to ensure a permanently high toughness of the overall laminate.

The substrate layer preferably consists of a thermoplastic polymer, in particular polymethyl methacrylates, polybutyl methacrylates, polyethylene terephthalates, polybutylene terephthalates, polyvinylidene fluorides, polyvinyl chlorides, polyesters, polyolefins, acrylonitrile-ethylene-propylene-diene-styrene copolymers (A-EPDM), polyetherimides, polyetherketones, polyphenylene sulfides, polyphenylene ethers or mixtures thereof.

Polyethylene, polypropylene, polystyrene, polybutadiene, polyester, polyamides, polyether, polycarbonate, polyvinylacetal, polyacrylonitrile, polyacetal, polyvinyl alcohol, polyvinyl acetate, phenol resins, urea resins, melamine resins, alkyd resins, epoxy resins or polyurethanes, the block or graft copolymers thereof and blends thereof may furthermore be mentioned.

ABS, AES, AMMA, ASA, EP, EPS, EVA, EVAL, HDPE, LDPE, MABS, MBS, MF, PA, PA6, PA66, PAN, PB, PBT, PBTP, PC, PE, PEC, PEEK, PEI, PEK, PEP, PES, PET, PETP, PF, PI, PIB, PMMA, POM, PP, PPS, PS, PSU, PUR, PVAC, PVAL, PVC, PVDC, PVP, SAN, SB, SMS, UF, UP plastics (abbreviation according to DIN 7728) and aliphatic polyketones may preferably be mentioned.

Particularly preferred substrates are polyolefins, such as, for example, PP (polypropylene), which optionally may be isotactic, syndiotactic or atactic and optionally may be unoriented or oriented by uniaxial or biaxial stretching, SAN (styrene-acrylonitrile copolymers), PC (polycarbonates), PMMA (polymethyl methacrylates), PBT (poly(butylene terephthalate)s), PA (polyamides), ASA (acrylonitrile-styrene-acrylate copolymers) and ABS (acrylonitrile-butadiene-styrene copolymers) and the blends thereof. PP, SAN, ABS, ASA and blends of ABS or ASA with PA or PBT or PC are particularly preferred.

ASA, in particular according to DE 19 651 350, and the blend ASA/PC are very particularly preferred. Polymethyl methacrylate (PMMA) or toughened PMMA is likewise preferred.

The layer thickness is preferably from 50 μm to 5 mm. From 100 to 1000 μm, in particular from 100 to 500 μm, is particularly preferred, especially if the back of the substrate layer is sprayed.

The polymer of the substrate layer may comprise additives. Fillers or fibers are particularly suitable. The substrate layer may also be colored and thus simultaneously serve as a color-imparting layer.

Further Layers

In addition to the top layer and the substrate layer, the film may comprise further layers.

For example, color-imparting intermediate layers or further layers of thermoplastic material (thermoplastic intermediate layers) which strengthen the film or serve as release layers, as disclosed, for example, in WO 2004/009251, are suitable.

Thermoplastic intermediate layers may consist of the polymers mentioned above under substrate layer.

Polymethyl methacrylate (PMMA), preferably toughened PMMA, is particularly preferred. Polyurethane may also be mentioned.

Color-imparting layers can likewise consist of said polymers.

They comprise dyes or pigments which are distributed in the polymer layer.

A preferred film has, for example, the following layer structure, the alphabetic sequence corresponding to the spatial arrangement:

A) Top layer
B) Thermoplastic intermediate layer (optional)
C) Color-imparting intermediate layer (optional)
D) Substrate layer
E) Adhesive layer (optional)

An adhesive layer may be applied to the back of the substrate layer (i.e. the side facing the object with which lamination is to be effected) if the film is to be adhesively bonded to the substrate.

A protective layer, for example a peelable film which prevents unintentional curing, can be applied to the transparent top layer. The thickness may be, for example, from 50 to 100 μm. The protective layer may consist of, for example, polyethylene or polyterephthalate. The protective layer can be removed prior to irradiation.

However, the irradiation can also be effected through the protective layer, and for this purpose the protective layer must be transparent in the wavelength range of the irradiation.

The total thickness of the film is preferably from 50 to 1000 μm.

Production of the Laminated Sheet or Film

A laminate comprising the layers B) to D) can be produced, for example, by coextrusion of all or some of the layers.

For the coextrusion, the individual components are rendered flowable in extruders and are brought into contact with one another by means of special apparatuses so that the films having the layer sequence described above result. For example, the components can be coextruded through a sheet die. This method is explained in EP-A2-0 225 500. In addition to the methods described there, adapter coextrusion can also be used.

The laminate can be produced by conventional methods, for example by coextrusion, as described above, or by lamination of the layers, for example in a heatable nip. First, a laminate of the layers with the exception of the top layer can be produced in this manner, and the top layer can then be applied by conventional methods.

In the extrusion (including coextrusion) of the radiation-curable materials, the preparation of the radiation-curable material by mixing of the components and the production of the top layer can be effected in one operation.

For this purpose, thermoplastic components, for example unsaturated polymers i) or saturated polymers under iii) (see above) can first be melted in the extruder. The necessary melting point depends on the respective polymer. Preferably after the melting process, the further components, in particular radiation-curable, low molecular weight compounds ii) (see above) can be metered in. The compounds act as plasticizers so that the temperature at which the material is present as a melt decreases. The temperature during addition of the radiation-curable compound must in particular be below a critical temperature at which thermal curing of the radiation-curable compound takes place.

The critical temperature can readily be determined by a calorimetric measurement, i.e. of the heat absorption with increasing temperature, corresponding to the above-described determination of the glass transition temperature.

The radiation-curable material is then extruded directly as a top layer onto the existing laminate or, in the case of coextrusion, with layers of the laminate. By means of the extrusion, the laminated sheet or film is directly obtained.

The radiation-curable material can preferably be applied to the substrate layer or to the laminate in a simple manner, for example by spraying, trowelling, knife coating, brushing, rolling, roll-coating, pouring, lamination, etc., and, if appropriate, can be dried.

The top layer is resistant to blocking, i.e. it is not tacky, and is radiation-crosslinkable. The laminated sheet or film can be molded by a thermoplastic method. If desired, a protective layer (protective film) can be placed on the top layer directly after the production of the laminated sheet or film.

The laminated sheet or film has high gloss and good mechanical properties. Tearing is scarcely observable.

The extensibility of the laminated sheet or film is preferably at least 100%, based on the unextended state (at 140° C. at a thickness of 30 μm).

Methods of Use

The film can be stored without partial curing (as described in EP-A2 819 516) until subsequent use.

Adhesion or deterioration of the performance characteristics before subsequent use is not observed or scarcely observed.

The film is preferably used as a laminating material.

Preferably, the lamination of the substrate is first effected and then the curing of the top layer by radiation.

The lamination can be effected by adhesive bonding of the film to the substrates. For this purpose, the film is provided on the back of the substrate layer, preferably with the adhesive layer E. Suitable substrates are those of wood, plastic or metal.

The lamination can also be effected by spraying the back of the film. For this purpose, the film is preferably thermoformed in a thermoforming mold and the back of the substrate layer sprayed with a plastics material. The plastics material comprises, for example, polymers which were mentioned above in the description of the substrate layer or, for example, polyurethane, in particular polyurethane foam. The polymers may comprise additives, in particular, for example, fibers, such as glass fibers, or fillers.

The radiation curing of the top layer is preferably effected after the thermoforming process and particularly preferably after the spraying of the back of the film.

The radiation curing is effected by means of high-energy light, e.g. UV light or electron beams. The radiation curing can be effected at relatively high temperatures. A temperature above the $T_g$ of the radiation-curable binder is preferred.

Here, radiation curing means the free radical polymerization of polymerizable compounds caused by electromagnetic and/or corpuscular radiation, preferably UV light in the wavelength range of $\lambda=200$ to 700 nm or electron radiation in the range of 150 to 300 keV and particularly preferably with a radiation dose of at least 80, preferably from 80 to 3000, mJ/cm².

In addition to radiation curing, further curing mechanisms may also be involved, for example thermal, moisture, chemical and/or oxidative curing.

The laminating materials can be applied once or several times by a very wide range of spraying methods, such as, for example, air pressure, airless or electrostatic spraying methods with the use of one- or two-component spraying units, but also by spraying, trowelling, knife coating, brushing, rolling, roll-coating, pouring, lamination, spraying of the back or coextrusion.

The coat thickness is as a rule in the range from about 3 to 1000 g/m² and preferably from 10 to 200 g/m².

The drying and curing of the coatings is generally effected under standard temperature conditions, i.e. without heating of the coating. However, the mixtures according to the invention can also be used for the production of coatings which, after application, are dried and cured at elevated temperature, for example at 40-250° C., preferably 40-150° C. and in particular at 40-100° C. This is limited by the heat stability of the substrate.

Furthermore, a process for the coating of substrates is disclosed, in which the coating material according to the invention or coating formulations comprising it, to which, if appropriate, heat-curable resins have been added, is or are applied to the substrate, dried and then cured by means of electron beams or UV exposure under an oxygen-containing atmosphere or preferably under inert gas, if appropriate at temperatures up to the drying temperature.

The process for the coating of substrates can also be carried out in such a way that, after the application of the coating material according to the invention or coating formulations, irradiation with electron beams or UV light under oxygen or preferably under inert gas is first effected in order to achieve preliminary curing, a thermal treatment is subsequently effected at temperatures of up to 160° C., preferably between 60 and 160° C., and final curing is then effected by means of electron beams or UV light under oxygen or preferably under inert gas.

If a plurality of layers of the laminating material are applied one on top of the other, drying and/or radiation curing can, if appropriate, be effected after each laminating process.

Suitable radiation sources for the radiation curing are, for example, low-pressure mercury lamps, medium-pressure mercury lamps with high-pressure lamps and fluorescent tubes, pulsed lamps, metal halide lamps, electron flash apparatuses, which permit radiation curing without a photoinitiator, or excimer lamps. Radiation curing is effected by the action of high-energy radiation, i.e. UV radiation or daylight, preferably light in the wavelength range of $\lambda$=200 to 700 nm, particularly preferably of $\lambda$=200 to 500 nm and very particularly preferably of $\lambda$=250 to 400 nm, or by irradiation with high-energy electrons (electron radiation; 150 to 300 keV). Radiation sources used are, for example, high-pressure mercury vapor lamps, lasers, pulsed lamps (flashlight), halogen lamps or excimer lamps. The radiation dose usually sufficient for crosslinking in the case of UV curing is in the range from 80 to 3000 mJ/cm$^2$.

Of course, a plurality of radiation sources can also be used for the curing, e.g. two to four.

These may also emit in respect of different wavelength ranges.

The drying and/or thermal treatment can also be effected in addition to or instead of the thermal treatment by NIR radiation, NIR radiation being defined here as electro-magnetic radiation in the wavelength range from 760 nm to 2.5 μm, preferably from 900 to 1500 nm.

The irradiation can, if appropriate, also be carried out in the absence of oxygen, for example under an inert gas atmosphere. Suitable inert gases are preferably nitrogen, noble gases, carbon dioxide or combustion gases. Furthermore, the irradiation can be effected by covering the laminating material with transparent media. Transparent media are, for example, plastics films, glass or liquids, e.g. water. Irradiation in the manner described in DE-A1 199 57 900 is particularly preferred.

If crosslinking agents which effect additional thermal crosslinking, e.g. isocyanates, are also present, the thermal crosslinking can be carried out, for example, simultaneously or after the radiation curing, by increasing the temperature to 150° C., preferably to 130° C.

Fields of Use and Advantages

The films can be used for laminating moldings. Any desired moldings are suitable. Particularly preferably, the films are used for laminating moldings in which very good surface properties, high resistance to weathering and good UV resistance are important. The surfaces obtained are moreover very scratch-resistant and have good adhesive strength so that destruction of the surfaces by scratching or delamination of the surfaces is reliably prevented. Thus, moldings for exterior use outside buildings constitute a preferred field of use. In particular, the films are used for the lamination of automotive parts, for example fenders, door trims, bumpers, spoilers, skirts as well as exterior mirrors being suitable.

An advantage of the present invention is that the coating materials according to the invention have great hardness in combination with high resilience, depending on the composition, which makes such coating materials particularly suitable for finishes which are exposed to high stresses and which nevertheless must not flake. Examples of these are finishes on bumpers, spoilers or door sills.

Other compositions according to the invention have extremely high hardness in combination with acceptable resilience, which makes them particularly suitable for finishes over large areas which are subject to little stress, such as, for example, in car roofs, engine hoods or doors. ppm and percentages used this document relate to percentages by weight and ppm by weight, unless stated otherwise.

The examples which follow are intended to illustrate the invention but not to restrict it to these examples.

EXAMPLES

The Following Compounds were Used

Isocyanurate (Basonat® HI 100 from BASF): polyisocyanate (isocyanurate) based on hexamethylene diisocyanate with an NCO content according to DIN EN ISO 11909 of from 21.5 to 22.5%
Biuret (Basonat® HB 100 from BASF): polyisocyanate (biuret) based on hexamethylene diisocyanate with an NCO content according to DIN EN 11909 of from 22 to 23%
Isocyanurate (Vestanat® T 1890 from Degussa): polyisocyanate (isocyanurate) based on isophorone diisocyanate with an NCO content according to DIN EN ISO 11909 of from 11.7 to 12.3%
Lupraphen® VP 9327: polyesterol from BASF AG comprising adipic acid/cyclohexanedimethanol/isophthalic acid, having an average molar mass of 800 g/mol
Pentaerythrityl tri/tetraacrylate mixture, commercial product from UCB, OH number 103 mg KOH/g
Allophanate obtained from hexamethylene diisocyanate and hydroxyethyl acrylate, described in WO 00/39183, page 24, table 1.

Example 1

Bis-(4-hydroxycyclohexane)isopropylidene and Lupraphen® VP 9327 were coarsely dispersed in hydroxyethyl acrylate and pentaerythrityl tri/tetraacrylate at 60° C. with stirring. The isocyanates, hydroquinone monomethyl ether, 1,6-di-tert-butyl-para-cresol and butyl acetate were added to this suspension. After the addition of dibutyltin dilaurate, the batch warmed up. At an internal temperature of 75° C., stirring was effected for several hours until the NCO value of the reaction mixture showed virtually no further change. Methanol was then added until an NCO value of 0% was reached.

The composition was as follows:

| | | |
|---|---|---|
| Bis-(4-hydroxycyclo-hexane)isopropylidene | 94.88 g | (30 mol % of OH) |
| Lupraphen ® VP 9327 | 105.50 g | (10 mol % of OH) |
| Hydroxyethyl acrylate | 79.75 g | (27.5 mol % of OH) |
| Pentaerythrityl tri/tetraacrylate | 389.13 g | (27.5 mol % of OH) |
| Isocyanurate (based on HDI) | 262.08 g | (55 mol % of NCO) |
| Isocyanurate (based on IPDI) | 273.15 g | (45 mol % of NCO) |
| Hydroquinone monomethyl ether | 0.602 g | (0.05% based on solid) |

| | | |
|---|---|---|
| 1,6-Di-tert-butyl-para-cresol | 1.204 g | (0.1% based on solid) |
| Butyl acetate | 516.21 g | (70% solids) |
| Dibutyltin dilaurate | 0.241 g | (0.02% based on solid) |
| Methanol | 10.65 g | (5 mol % of OH) |

Properties of the Uncured Binder:
  Tg=18.3° C., η=40-50 Pa·s/RT, double bond density=2.56 mol/kg (100%)
Properties of the Cured Clear Coat:
  Relative residual gloss 57.40% according to AMTEC-Kistler test method Example 2

Bis-(4-hydroxycyclohexane)isopropylidene was coarsely dispersed in hydroxyethyl acrylate and pentaerythrityl tri/tetraacrylate at 60° C. with stirring. The isocyanates, hydroquinone monomethyl ether, 1,6-di-tert-butyl-para-cresol and butyl acetate were added to this suspension. After the addition of dibutyltin dilaurate, the batch warmed up. At an internal temperature of 75° C., stirring was effected for several hours until the NCO value of the reaction mixture showed virtually no further change. Methanol was then added until an NCO value of 0% was reached.

| | | |
|---|---|---|
| Bis-(4-hydroxycyclohexane)isopropylidene | 63.25 g | (40 mol % of OH) |
| Hydroxyethyl acrylate | 39.88 g | (27.5 mol % of OH) |
| Pentaerythrityl tri/tetraacrylate | 194.81 g | (27.5 mol % of OH) |
| Isocyanurate (based on HDI) | 89.34 g | (37.5 mol % of NCO) |
| Biuret (based on HDI) | 92.87 g | (37.5 mol % of NCO) |
| Isocyanurate (based on IPDI) | 75.88 g | (25 mol % of NCO) |
| Hydroquinone monomethyl ether | 0.278 g | (0.05% based on solid) |
| 1,6-Di-tert-butyl-para-cresol | 0.556 g | (0.1% based on solid) |
| Butyl acetate | 238.30 g | (70% solids) |
| Dibutyltin dilaurate | 0.222 g | (0.04% based on solid) |
| Methanol | 4.46 g | (5 mol % of OH) |

Properties of the Uncured Binder:
  $T_g$=13.2° C., η=47 Pa·s/RT, double bond density=2.8 mol/kg (100%)
Properties of the Cured Clear Coat:
  Relative residual gloss 57.00% according to AMTEC-Kistler test method Example 3

Bis-(4-hydroxycyclohexane)isopropylidene was coarsely dispersed in hydroxyethyl acrylate and pentaerythrityl tri/tetraacrylate at 60° C. with stirring. The isocyanates, hydroquinone monomethyl ether, 1,6-di-tert-butyl-para-cresol and butyl acetate were added to this suspension. After the addition of dibutyltin dilaurate, the batch warmed up. At an internal temperature of 75° C., stirring was effected for several hours until the NCO value of the reaction mixture showed virtually no further change. Methanol was then added until an NCO value of 0% was reached.

| | |
|---|---|
| Bis-(4-hydroxycyclohexane)isopropylidene | 40 mol % of OH |
| Hydroxyethyl acrylate | 27.5 mol % of OH |
| Pentaerythrityl tri/tetraacrylate | 27.5 mol % of OH |
| Allophanate from HDI and HEA | 55 mol % of NCO |
| Isocyanurate (based on IPDI) | 45 mol % of NCO |
| Hydroquinone monomethyl ether | 0.05% based on solid |
| 1,6-Di-tert-butyl-para-cresol | 0.1% based on solid |
| Butyl acetate | 70% solids |
| Dibutyltin dilaurate | 0.04% based on solid |
| Methanol | 5 mol % of OH |

Properties of the Uncured Binder:
  Tg=11.3° C., η=6.6 Pa·s/RT, double bond density (theoretical)=4.41 mol/kg (100%)
Double bond density (theoretical)=4.41 mol/kg (100%)
Double bond density (hydrogenation iodine number)=77 g of iodine/100 g (corresponds to 3.03 mol/kg (70%), therefore 4.33 mol/kg (100%))

For the determination of the hydrogenation iodine number, a sample was dissolved in glacial acetic acid and hydrogenated at 30° C. and over $BaSO_4$-supported palladium. The iodine number and the double bond density are calculated from the hydrogen absorption.

Properties of the Cured Clear Coat:
  Relative residual gloss 52.6% according to AMTEC-Kistler test method Comparative Example Example 1 from WO 00/63015 was reworked and the relative residual gloss value was determined.
Not more than 35% were measured.

Use Examples

Determination of the performance characteristics of pendulum damping, Erichsen cupping and scratch resistance The determination of the pendulum damping was effected analogously to DIN 53157. For this purpose, the radiation-curable compositions were applied to glass with a wet film thickness of 400 μm. The wet films were dried in air for 15 minutes at room temperature and then dried for 20 minutes at 100° C. The curing of the films obtained in this manner was effected on an IST coating unit (type M 40 2×1-R-IR-SLC-So inert) with 2 UV lamps (mercury high-pressure lamps type M 400 U2H and type M 400 U2HC) and at a conveyor belt speed of 10 m/min under a nitrogen atmosphere ($O_2 \leq 500$ ppm). The radiation dose was about 1900 mJ/cm². The pendulum damping is a measure of the hardness of the coating. High values indicate great hardness.

The determination of the Erichsen cupping was effected analogously to DIN 53156. For this purpose, the respective formulation according to the invention was applied by means of a box-type doctor blade with a wet film thickness of 200 μm to BONDER plate 132. For curing, exposure was effected in the manner described above. The Erichsen cupping was then determined by pressing a metal ball into the uncoated side of the plate. The Erichsen cupping is a measure of the flexibility and elasticity. It is stated in millimeters (mm). High values indicate high flexibility.

The determination of the scratch resistance was effected by means of the Scotch-Brite test on storage for 7 days in a conditioned room. In the Scotch-Brite test, a 3×3 cm silicon carbide modified nonwoven (Scotch Brite SUFN, from 3M) as a test specimen is fastened to a cylinder. This presses the nonwoven with 250 g onto the coating and is pneumatically moved over the coating. The magnitude of the deflection is 7 cm. After 10 or 50 double strokes (DS) the gloss (eight-fold determination) is measured analogously to DIN 67530 at an angle of incidence of 20° in the middle region of the stress. The residual gloss value in percent is obtained from the ratio of gloss after stress to initial gloss. After 50 double strokes, a gentle wiping is effected twice with a soft cloth impregnated with cleaner's naphtha and the residual gloss is measured again.

The preparation of the radiation-curable material is effected by thorough mixing of 100 parts by weight of the urethane acrylates obtained under examples 1 to 3 with 4 parts by weight of Irgacure® 184 from Ciba Spezialitätenchemie (commercially available photoinitiator). Example I from WO 00/63015 served for comparison.

| Example | Pendulum damping [s] | Erichsen cupping [mm] |
|---|---|---|
| 1 | 193 | 2.0 |
| 2 | 177 | 4.0 |
| 3 | 180 | 0.9 |
| Comparative example | 166 | 3.3 |

| Example | Residual gloss [%] after 10 DS | Residual gloss [%] after 50 DS | Residual gloss [%] after cleaner's naphtha |
|---|---|---|---|
| 1 | 89.2 | 79.1 | 82.0 |
| 2 | 88.7 | 82.0 | 83.6 |
| 3 | 94.8 | 83.3 | 83.8 |
| Comparative example | 78.1 | 59.6 | 60.8 |

The invention claimed is:

1. A radiation-curable laminated sheet or film comprising at least one substrate layer and a top layer comprising a radiation-curable material which comprises a binder having a glass transition temperature below 20° C. and a content of ethylenically unsaturated groups of more than 2 mol/kg of binder, wherein a color-imparting intermediate layer is present between the substrate layer and the top layer,
wherein said radiation-curable laminated sheet or film has an extensibility of at least 100%, based on an unextended state at 140° C. at a thickness of 30 μm.

2. The radiation-curable laminated sheet or film according to claim 1, wherein a layer of polymethyl methacrylates, polybutyl methacrylates, polyethylene terephthalates, polybutylene terephthalates, polyvinylidene fluorides, polyvinyl chlorides, polyesters, polyolefins, acrylonitrile-ethylene-propylene-diene-styrene copolymers (A-EPDM), polyetherimides, polyetherketones, polyphenylene sulfides, polyphenylene ethers or mixtures thereof are present between the color-imparting intermediate layer and the top layer.

3. The radiation-curable laminated sheet or film according to claim 1, wherein the radiation-curable material comprises one or more mixtures selected from the group consisting of:
a mixture of polymers having ethylenically unsaturated groups and a molar mass of more than 2000 g/mol;
a mixture of polymers having ethylenically unsaturated groups and a molar mass of more than 2000 g/mol, with ethylenically unsaturated, low molecular weight compounds having a molar mass of less than 2000 g/mol; and
a mixture of saturated, thermoplastic polymers with ethylenically unsaturated compounds.

4. The radiation-curable laminated sheet or film according to claim 1, wherein the radiation-curable material comprises not more than 10% by weight of compounds which have only one curable group.

5. The radiation-curable laminated sheet or film according to claim 1, wherein the binder comprises at least one urethane (meth)acrylate which comprises at least one cycloaliphatic isocyanate.

6. The radiation-curable laminated sheet or film according to claim 1, wherein the binder comprises at least one urethane (meth)acrylate which comprises isophorone diisocyanate or hexamethylene diisocyanate.

7. A laminated shaped article obtainable by a process comprising:
laminating a shaped article with a radiation-curable laminated sheet or film thereby forming a radiation-curable laminated sheet or film, wherein said radiation-curable laminated sheet or film comprises at least one substrate layer and a top layer, and wherein the top layer comprising a radiation-curable material which comprises a binder having a glass transition temperature below 20° C. and a content of ethylenically unsaturated groups of more than 2 mol/kg of binder;
thermoforming the radiation-curable laminated sheet or film in a thermoforming mold;
spraying the back of the substrate layer with a plastics material; and
radiation curing the top layer either after the thermoforming or after the spraying,
wherein said radiation-curable laminated sheet or film has an extensibility of at least 100%, based on an unextended state at 140° C. at a thickness of 30 μm.

8. The radiation-curable laminated sheet or film according to claim 1, wherein said substrate layer is comprised of at least one thermoplastic polymer selected from the group consisting of polymethyl methacrylates, polybutyl methacrylates, polyethylene terephthalates, polybutylene terephthalates, polyvinylidene fluorides, polyvinyl chlorides, polyesters, polyolefins, acrylonitrile-ethylene-propylene-diene-styrene copolymers (A-EPDM), polyetherimides, polyetherketones, polyphenylene sulfides, polyphenylene ethers and mixtures thereof.

9. The radiation-curable laminated sheet or film according to claim 1, wherein said substrate layer is comprised of at least one polymer selected from the group consisting of polyethylene, polypropylene, polystyrene, polybutadiene, polyester, polyamides, polyether, polycarbonate, polyvinylacetal, polyacrylonitrile, polyacetal, polyvinyl alcohol, polyvinyl acetate, phenol resins, urea resins, melamine resins, alkyd resins, epoxy resins or polyurethanes, the block or graft copolymers thereof and blends thereof.

10. The radiation-curable laminated sheet or film according to claim 1, wherein said substrate layer is comprised of at least one polymer selected from the group consisting of polypropylene, styrene-acrylonitrile copolymers, polycarbonates, polymethyl methacrylates, polybutylene terephthalate, polyamides, acrylonitrile-styrene-acrylate copolymers and acrylonitrile-butadiene-styrene copolymers and the blends thereof.

11. The radiation-curable laminated sheet or film according to claim 1, wherein said substrate layer is comprised of at least one polymer selected from the group consisting of isotactic polypropylene, syndiotactic polypropylene and atactic polypropylene.

12. The radiation-curable laminated sheet or film according to claim 1, wherein said substrate layer is comprised of at least one polymer selected from the group consisting of acrylonitrile-styrene-acrylate copolymer, acrylonitrile-styrene-acrylate/polycarbonate copolymer, polymethyl methacrylate and toughened polymethyl methacrylate.

13. The radiation-curable laminated sheet or film according to claim 1, wherein said substrate layer has a thickness of from 50 μm to 5 mm.

14. The radiation-curable laminated sheet or film according to claim 1, wherein said substrate layer has a thickness of from 100 μm to 1,000 μm.

15. The radiation-curable laminated sheet or film according to claim 1, wherein said substrate layer has a thickness of from 100 μm to 500 μm.

16. The radiation-curable laminated sheet or film according to claim 1, produced by coextrusion of all of said layers.

17. The radiation-curable laminated sheet or film according to claim 1, which is a sheet.

18. The radiation-curable laminated sheet or film according to claim 1, which is a film.

* * * * *